United States Patent
Singer

(10) Patent No.: US 10,735,946 B2
(45) Date of Patent: *Aug. 4, 2020

(54) METHODS AND SYSTEMS FOR MANAGING RESOURCES ON A MOBILE TRADING DEVICE

(71) Applicant: Trading Technologies International, Inc., Chicago, IL (US)

(72) Inventor: Scott F. Singer, Green Oaks, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,992

(22) Filed: Oct. 17, 2019

(65) Prior Publication Data

US 2020/0053551 A1 Feb. 13, 2020

Related U.S. Application Data

(63) Continuation of application No. 16/226,032, filed on Dec. 19, 2018, now Pat. No. 10,492,059, which is a continuation of application No. 15/723,962, filed on Oct. 3, 2017, now Pat. No. 10,200,854, which is a continuation of application No. 14/502,946, filed on Sep. 30, 2014, now Pat. No. 9,813,895.

(51) Int. Cl.
*H04W 4/50* (2018.01)
*H04W 8/22* (2009.01)
*G06Q 40/04* (2012.01)

(52) U.S. Cl.
CPC .............. *H04W 8/22* (2013.01); *G06Q 40/04* (2013.01); *H04W 4/50* (2018.02)

(58) Field of Classification Search
CPC ........... H04W 8/22; H04W 4/02; H04W 4/50; G06Q 40/04
See application file for complete search history.

(56) References Cited

U.S. PATENT DOCUMENTS

| 8,566,220 B2 | 10/2013 | Lidor et al. | |
| 9,813,895 B2 | 11/2017 | Singer | |
| 10,200,854 B2 | 2/2019 | Singer | |
| 2008/0301061 A1* | 12/2008 | Kittelsen | G06Q 40/06 705/36 R |
| 2012/0297304 A1* | 11/2012 | Maxwell | H04M 1/72569 715/728 |

(Continued)

*Primary Examiner* — Chuong A Ngo
(74) *Attorney, Agent, or Firm* — McDonnell Boehnen Hulbert & Berghoff LLP

(57) ABSTRACT

Certain embodiments provide a method including obtaining data at a first time using at least one sensor associated with a mobile computing device, the at least one sensor arranged to gather data regarding at least one operating factor for the mobile computing device, the mobile computing device configured to receive market data and execute a trading application. The example method includes analyzing the data obtained from the at least one sensor to determine the at least one operating factor. The example method includes determining a first operating state of the mobile computing device based on the at least one operating factor. The example method includes altering a function of the mobile computing device with respect to the trading application based on the first operating state.

8 Claims, 7 Drawing Sheets

(56) References Cited

U.S. PATENT DOCUMENTS

2014/0179297 A1* 6/2014 Sahoo .................... H04W 8/22
                                                455/418
2014/0181302 A1   6/2014 Sahoo
2016/0094984 A1   4/2016 Singer
2018/0027408 A1   1/2018 Singer
2019/0149981 A1   5/2019 Singer

* cited by examiner

METHODS AND SYSTEMS FOR MANAGING RESOURCES ON A MOBILE TRADING DEVICE

CROSS-REFERENCE TO RELATED APPLICATIONS

This patent application is a continuation of U.S. patent application Ser. No. 16/226,032, filed Dec. 19, 2018, now U.S. Pat. No. 10,492,059, which is a continuation of U.S. patent application Ser. No. 15/723,962, filed Oct. 3, 2017, now U.S. Pat. No. 10,200,854, which is a continuation of U.S. patent application Ser. No. 14/502,946, filed Sep. 30, 2014, now U.S. Pat. No. 9,813,895, the contents of each of which are hereby incorporated by reference for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

The rapid and dynamic nature of the market coupled with the increasing popularity of mobile computing devices (e.g. smartphones, tablets, PDAs, etc.), has given rise to the market participant of today utilizing mobile trading devices in place of traditional (e.g., less portable) trading devices.

BRIEF DESCRIPTION OF THE FIGURES

Certain embodiments are disclosed with reference to the following drawings.

Figure 1:
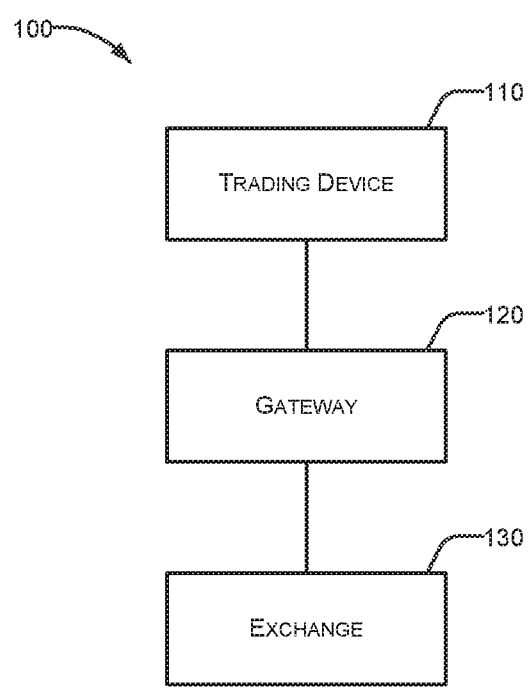
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

As used herein, the terms "user," "trading device," "trading application," "trading platform," and/or "trader" are employed interchangeably and generally refer to a party having interactions with a computing device (e.g., a trading application and/or an algorithmic trading strategy) configured to communicate with an electronic exchange.

In recent years, increased processing power has allowed greater amounts of data to be generated and processed for consumption by the user. For example, financial markets continue to grow each year as new companies, currencies, and financial products become tradeable assets. When the financial market grows, data (e.g., ticker prices, forecasts, status information, etc.) associated with each new tradeable asset is added to the existing data associated with tradeable assets. Thus, the volume of data required to keep a trader informed on relevant tradeable assets continues to grow in magnitude. Mobile computing devices provide traders with the ability to be connected to that volume of data at will but may lack the processing power and/or network bandwidth to efficiently process the volume of data.

A mobile computing device (e.g. a smartphone, tablet, etc.) can deploy applications traditionally associated with a desktop experience, with little to no trade-off in the appearance and/or ease-of-use associated with a user experience (UX). As mobile computing devices have grown more powerful, activities that have traditionally required the processing power and/or capability of a desktop application may now be performed away from the desktop utilizing the mobile computing device. For example, many mobile computing devices are now being used by traders to deploy mobile versions of traditional desktop trading applications. Accordingly, a trader may utilize the mobile version of the desktop trading application in order to remain in contact with one or more exchanges as an active market participant.

A client device, such as a mobile computing device, and a server use network communications to send and receive data. In many instances, client devices regularly request and receive data from the server in specified intervals. These specified intervals are referred to herein as transmission rates. In a wireless mobile computing environment, high transmission rates often result in a higher energy usage because data radios such as 4G/LTE and Wi-Fi have a large energy cost to operate. Thus, use of these example data radios exacerbates the effects of the energy cost.

For example, suppose a trader leaves a trading application running on his or her mobile computing device while not actively participating in the market or interacting with the trading application. The trader is not directing attention to the mobile computing device or the trading application (e.g., interacting with and/or looking at) and does not suspend or halt execution of the trading application. Continuous operation of the trading application on the trader's mobile computing device (e.g., high transmission rates) and/or the mobile computing device itself (e.g., simultaneous application execution) may diminish the battery power of the mobile computing at an advanced rate due to the handling of data at high transmission rates. Due to the exhaustion of battery resources, when a market event necessitating a user reaction occurs, the trader may not be able to react to the market event from the mobile computing device due to lack of battery power.

To better monitor and manage resources, an operational control module associated with a mobile trading device identifies and reacts to operational or operating states of the mobile computing device. The operational control module may determine categorical measurements, or characterizations of measurements, called operating factors, to identify an operating state. In some examples, an operating state of the mobile computing device may be defined using operating factors: power level, power consumption, environment, and activity. An example power level may denote external power, normal, low, and critical levels. In this example, normal denotes a range of 40% to 100% available battery, low denotes 20% to 39% available battery, and critical denotes 0%-19% available battery. Power consumption may be denoted as a normal, high, or low according to a comparison of observed power consumption against an average power consumption of the mobile computing device, for example. Environment may be denoted by visual conditions and noise levels observed (e.g., high/low light and/or high/low noise), for example. Activity may identify whether the user is moving in a vehicle, walking, running, or stationary, for example. In some examples, user attention may be implemented as a fifth category to assist in defining the operating state. User attention may be denoted as true or false, engaged or not engaged, etc., based on the user's interaction with the mobile computing device, for example.

By identifying an operating state based on operating factors and implementing functionality adjustments associated with the operating state, the operational control module helps ensure that traders are able to prolong use of mobile computing devices to react to market events. The trader or other user of the trading application of the mobile computing device may activate the operational control module by user input (e.g., a graphical user interface interaction or gyroscope/accelerometer-based interaction to detect movement and/or other use of the mobile computing device) or the operational control module may be activated automatically based on the usage or conditions detected at the mobile computing device.

In some examples, the operational control module may iterate through stages of monitoring the sensors of the mobile computing device in order to calibrate the operational control module without implementing any adjustments. Conversely, a calibration stage may not be necessary. The operating state may then be used by the operational control module to dictate certain adjustments to functionality of the mobile computing device or the trading application itself to create more opportunity for the market participant to react to market events while using the mobile computing device.

Adjustment of functionality of the mobile computing device or the trading application may be guided by rules, or rule sets, associated with operational states. In some examples, rule sets may be directly related to individual operating factors. A defined rule set may dictate constraints and/or permissions regarding operation of the trading application and/or the mobile computing device. For example, the defined rule set may dictate parameters regarding transmission rates, notification schemes, power distribution of the mobile computing device, network radio performance (Wi-Fi™, Bluetooth™, Zigbee™, etc.), and/or any other parameter accessible to be manipulated by an application programming interface. In some examples, the creation of operating states and associated rules may be configurable by the user of the mobile computing device or an administrator of the enterprise network with which the mobile computing device is associated. In other examples, the operating factors may be configured similarly. These operating states may be identified by name, number, or any alternate identification scheme in order to more easily create customized rule sets. Additionally or alternatively, the operating states, the operating factors, and associated defined rule sets may be associatively linked and stored in a database, lookup table, search tree, neural network, or any referenceable data structure.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments provide a method including obtaining data at a first time using at least one sensor associated with a mobile computing device, the at least one sensor arranged to gather data regarding at least one operating factor for the mobile computing device, the mobile computing device configured to receive market data and execute a trading application. The example method includes analyzing the data obtained from the at least one sensor to determine the at least one operating factor. The example method includes determining a first operating state of the mobile computing device based on the at least one operating factor. The example method includes altering a function of the mobile computing device with respect to the trading application based on the first operating state.

Certain embodiments provide a system including a mobile computing device configured to obtain data at a first time using at least one sensor associated with the mobile computing device, the at least one sensor arranged to gather data regarding at least one operating factor for the mobile computing device, the mobile computing device further configured to receive market data and execute a trading application. The example mobile computing device is to analyze the data obtained from the at least one sensor to determine the at least one operating factor. The example mobile computing device is to determine a first operating state of the mobile computing device based on the at least one operating factor. The example mobile computing device is to alter a function of the mobile computing device with respect to the trading application based on the first operating state.

Certain embodiments provide a tangible computer-readable storage medium comprising instructions that, when executed, cause a computing device to at least obtain data at a first time using at least one sensor associated with the mobile computing device, the at least one sensor arranged to gather data regarding at least one operating factor for the mobile computing device, the mobile computing device further configured to receive market data and execute a trading application. The example instructions cause the computing device to at least analyze the data obtained from the at least one sensor to determine the at least one operating factor. The example instructions cause the computing device to at least determine a first operating state of the mobile computing device based on the at least one operating factor. The example instructions cause the computing device to at least alter a function of the mobile computing device with respect to the trading application based on the first operating state.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or un-requested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
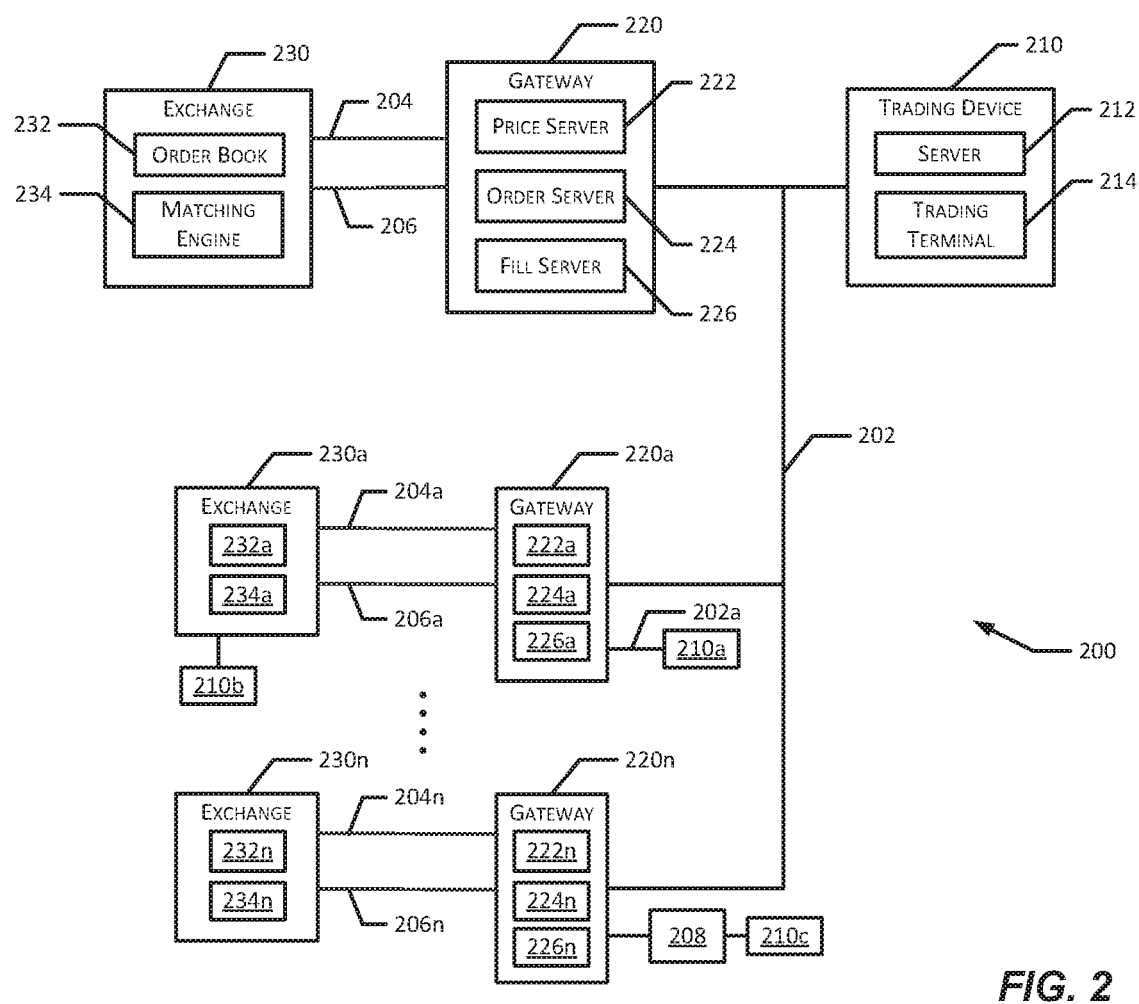
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
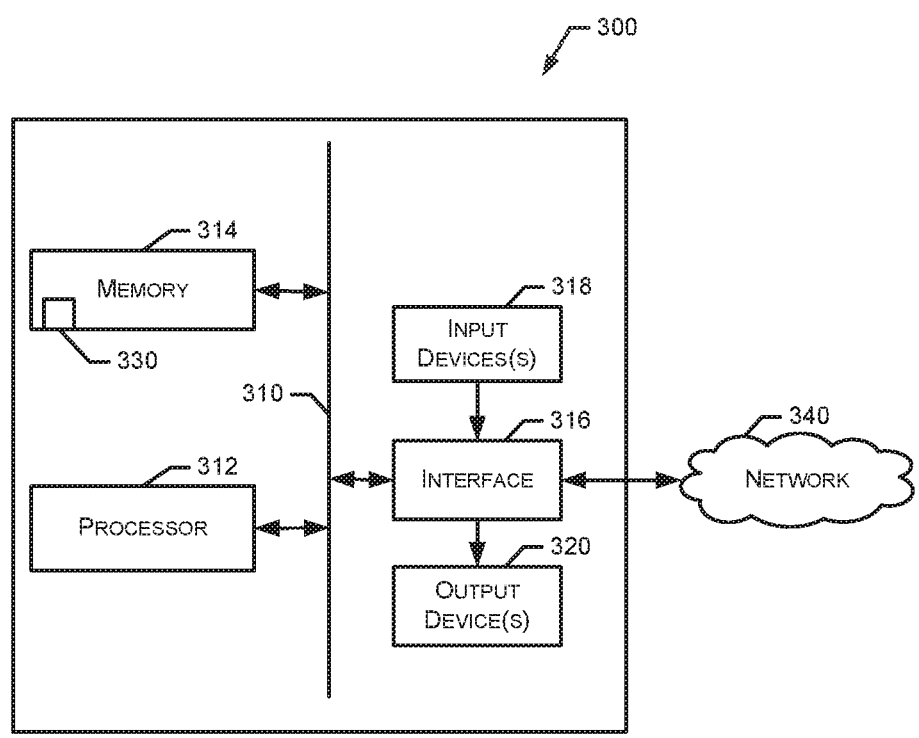
FIG. 3 illustrates a block diagram of an example mobile computing device which may be used to implement the disclosed embodiments.

FIG. 3 illustrates a block diagram of an example computing device 300 (e.g., a mobile computing device) which may be used to implement the disclosed embodiments. The example computing device may be a mobile computing device (e.g., smartphone, tablet, smartwatch, etc.). The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

The input device(s) 318 may include one or more sensors included in, attached to (e.g., removably attached to), and/or peripherally in communication with the computing device 300 for providing information to the computing device 300. Such sensors may include proximity sensors, photoresistors, accelerometers, gyroscopes, microphones, optical sensors, cameras, photovoltaic cells, magnetometers, heart-rate monitors, temperature sensors, galvanic response sensors, or the like. The input device(s) 318 may also include touch-screens (e.g., capacitive and resistive), keyboards, and/or mice.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Example Operational Control Systems and Methods

Example methods to monitor a computing device and associated trading application and or data feed based on an identified current operating state are disclosed and described herein. For example, operation, update, refresh rate, etc., can be adjusted based on a determination of a current operating state. In some examples one or more operating factors such as, power level, power consumption, activity, and/or environment may be used to identify the current operating state of the computing device 300. In general, the operating factor may refer to one or more sensor measurements. In some examples, a level of interaction with the computing device 300 and the trading application may be inferred from the current operating state.

Certain examples disclosed herein leverage one or more sensors of a computing device (e.g., computing device 300) using an operational control module 400 to identify an operating state. The examples further adjust the operation and/or functionality of the computing device 300 based upon the operating state. For example, the current operating state (e.g., defined by one or more of a power level, power consumption, activity, environment, attention, etc.) may dictate an alteration to the transmission rate of the computing device 300.

Figure 4:
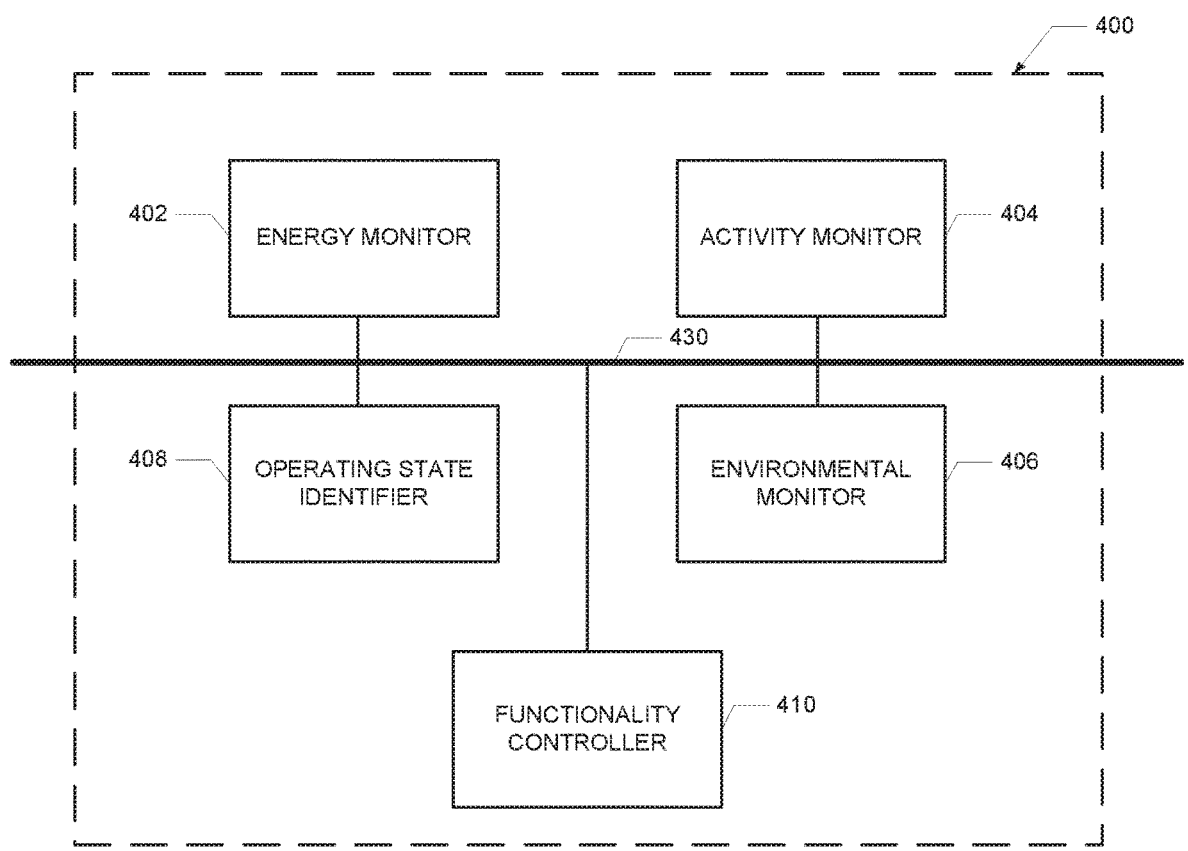
FIG. 4 illustrates a block diagram of an example operational control module in communication with the mobile computing device.

The computing device 300 can include an operational control module 400. FIG. 4 illustrates a block diagram of an example operational control module 400. The operational control module 400 operates in connection with the processor 312, memory 314, interface 316, input device(s) 318, and output device(s) 320 of the example FIG. 3. The operational control module 400 is able to communicate with and control the computing device 300 via the processor 312, the input device(s) 318, and the output device(s) 320. The operational control module 400 leverages these communications to interact with and control the operation of the trading application 330. Additionally, the operational control module 400 is able to utilize the memory 314 for storage of operating factors (e.g., measurements), results, and calculations. The operational control module 400 resides in the memory 314 of the computing device 300. In some examples, the operational control module 400 operates as a subsidiary module of the trading application 330. In other examples, the operational control module 400 operates as a discrete hardware component of the computing device 300.

The operational control module 400 of FIG. 4 includes an energy monitor 402, an operating state identifier 408, a functionality controller 410, an environmental monitor 406, and an activity monitor 404. The operational control module 400 of FIG. 4 may include additional, different, or fewer components. Additionally, the components of the operational control module 400 of FIG. 4 are in communication with one another as well as with other components of the computing device 300 of FIG. 3 via a communication bus 430. Components 402-410 of the operational control module 400 can be used to determine and/or impact an operating state of the computing device 300, for example.

The example energy monitor 402 determines available battery power and power consumption and creates a power level factor. For example, the energy monitor 402 may query the operating system of the computing device 300 utilizing programmatic methods to obtain the battery data from the computing device 300. The example energy monitor 402 also detects when the computing device is receiving power externally (e.g., is plugged in). In some examples, external power is identified by the operating system of the computing device 300 upon a query by the example energy monitor 402. In some examples, the energy monitor 402 subscribes to and receives power related notifications generated by the operating system. In other examples, the example energy monitor 402 identifies external power by observing voltage level on a charging circuit of the computing device 300. The power level factor, once created, can be stored and made available to the operating state identifier 408.

The example energy monitor 402 also communicates concurrently with an operating system of the computing device 300 to obtain a list of processes and their power consumptions. The example energy monitor 402 also may generate a power consumption factor. For example, the example energy monitor 402 accesses the memory 314 of the computing device 300 to store these processes and their observed consumptions. In certain embodiments, rolling averages are created for computing device 300 (in some instances, averages are kept for each observed process executed by the computing device 300) to obtain reference measurements for power consumption. These measurements become a baseline for a power consumption measurement. The power consumption measurements and the current rolling averages are stored for use by the operating state identifier 408. For example, a messaging application consuming 100 milliwatt (mW), a browsing application consuming 50 mW, and the operating system consuming 100 mW results in an example current power consumption measurement of 250 mW. In some examples, the example current power consumption measurement of 250 mW is then included when calculating the current rolling average for power consumption. The example energy monitor 402 stores the power consumption factor in the memory 314.

The example activity monitor 404 of FIG. 4 determines an activity factor of the computing device. The example activity monitor 404 is in communication with one or more input devices 318 associated with the computing device 300 (e.g., accelerometers, gyroscopes, etc.). The example activity monitor 404 determines velocity and/or acceleration of a detected movement of the computing device 300. The example activity monitor 404 may further, or additionally, determine the attitude, or orientation in space, of the computing device 300. In some examples, the activity monitor 404 queries and/or subscribes to notifications provided by the operating system of the computing device 300 for information provided by the incorporated accelerometers, gyroscopes, etc. In some examples, the example activity monitor 404 may use the velocity, acceleration, and/or attitude to determine an activity or state of a user of the computing device 300. For example, a null acceleration and velocity measurement would imply that the user of the device is stationary. A low velocity (e.g., 2 m/s) may indicate walking, or a high velocity (e.g., greater than 15 m/s) may indicate automobile or aerial activity, for example. In some examples, a medium velocity (e.g., 5 m/s) and/or a quickly varying gyroscope measurement (e.g., +/−2 rad/s) may indicate a running activity. The example activity monitor stores the activity factor of the user for use by the operating state identifier 408.

The example environmental monitor 406 of FIG. 4 determines environmental measurement(s) associated with the environment of the computing device 300 and creates an environmental factor. The example environmental monitor 406 is in communication with light and/or sound sensors associated with the computing device 300 (e.g., input device(s) 318). In some examples, one or more sensors can provide data to determine a focus of user attention with respect to the computing device 300. The one or more sensors may measure temperature, facial recognition, touch, light, sound, etc. Such example sensors may include photovoltaic cells, photoresistors, cameras, proximity sensors, microphones, temperature sensors, touch sensors, etc. The example environmental monitor 406 analyzes the environment in which the computing device 300 is operating. Additionally, ambient sound levels are sampled to determine how noisy, (e.g., loud) the operating environment of the user is. In some examples, the environmental control monitor 406 can identify a focus of user attention with respect to the computing device 300. In other examples, a temperature measurement is made by the example environmental monitor 406 and used in generating an operating state. The environmental factor is stored so that the operating state identifier 408 may gather it in order to identify an operating state.

The example operating state identifier 408 identifies the operating state. Initially, the example operating state identifier 408 gathers the operating factors from all components associated with the example operational control module 400 (e.g., the energy monitor 402, the environmental monitor 406, and the activity monitor 404). For example, the operating state identifier 408 may obtain the power level factor and the power consumption operating factor from the energy monitor 402. The operating state identifier 408 may also obtain the environmental factor (e.g., light and sound measurement) from the environmental monitor 406, for example. The operating state identifier 408 may also obtain the activity operating factor from the activity monitor 404 (e.g., acceleration and/or velocity measurement), for example.

The example operating state identifier 408 may compare the obtained measurements in the operating factors to ranges, thresholds, and/or baselines associated with each measurement of the operating factors to determine how to rank and evaluate each measurement. In some examples, the example operating state identifier utilizes a database stored in the memory 314 of the computing device 300 to identify an appropriate characterization of each measurement. For example, a remaining battery level of 30% obtained from the energy monitor 402 is compared an example range stored in the memory 314 of the computing device 300. The example range may indicate values between 20%-40% are designated as a low power level, for example. After the operating state identifier 408 compares the 30% value from the energy monitor 402 to the example range from the memory 314, the power level of the current operating state is identified "low."

In some examples, the operating state may be identified using the power level, power consumption, activity, and/or the environmental measurements. For example, an operating state may be identified as "external source" power level (e.g., wall outlet powered), "high" power consumption, "stationary and upright" activity, and "high light-low noise" environment. In some examples, it may be inferred from this identified operating state that the user may likely be in an office environment and engaged with the computing device 300. In other examples, a probability of user attention with respect to the computing device 300 may be inferred from a current operating state.

The example operating state identifier 408 can store the current operating state for use by the functionality controller 410. For example, the operating state identifier 408 may utilize the memory 314 of the computing device 300 to store the current operating state. In some examples, past operating states and predicted operating states are stored in the memory 314 by the operating state identifier 408.

The example functionality controller 410 implements changes to the computing device 300 and trading application based on the current operating state. In some examples, the functionality controller 410 implements functionality adjustments according to the current operating state identified by the example operating state identifier 408, the current operating state stored in the memory 314. The example functionality controller 410 implements changes via the processor 312 of the computing device 300. For example, when the current operating state has been obtained, the example functionality controller 410 identifies one or more adjustments to the functionality of the computing device 300 and/or trading application by referencing rule sets for the operating state and/or ranges of measurements of the operating factors, stored in the memory 314 of the computing device 300. For example, a rule associated with an operating state may describe an adjustment to the transmission rate of the computing device 300. In some examples, a rule associated with an operating state may describe an adjustment to the brightness of a display of the computing device 300. In some examples, rules associated with an operating state may be implemented in order to conserve and/or prolong battery life. In other examples, rules associated with an operating state may be implemented to provide more frequent transmissions. When the adjustment(s) have been identified, the functionality controller 410 implements adjustment(s) using the communication bus 430. In some examples, heuristics, or machine learning methods, are implemented by the functionality controller 410. These example heuristics can learn to (1) know most common operating states for certain times of the day, (2) anticipate a next operating state and current operating state based on learned patterns, and/or (3) identify operating states more quickly based on a combination of the foregoing and can proactively implement adjustment(s) to the computing device 300.

Figure 5:
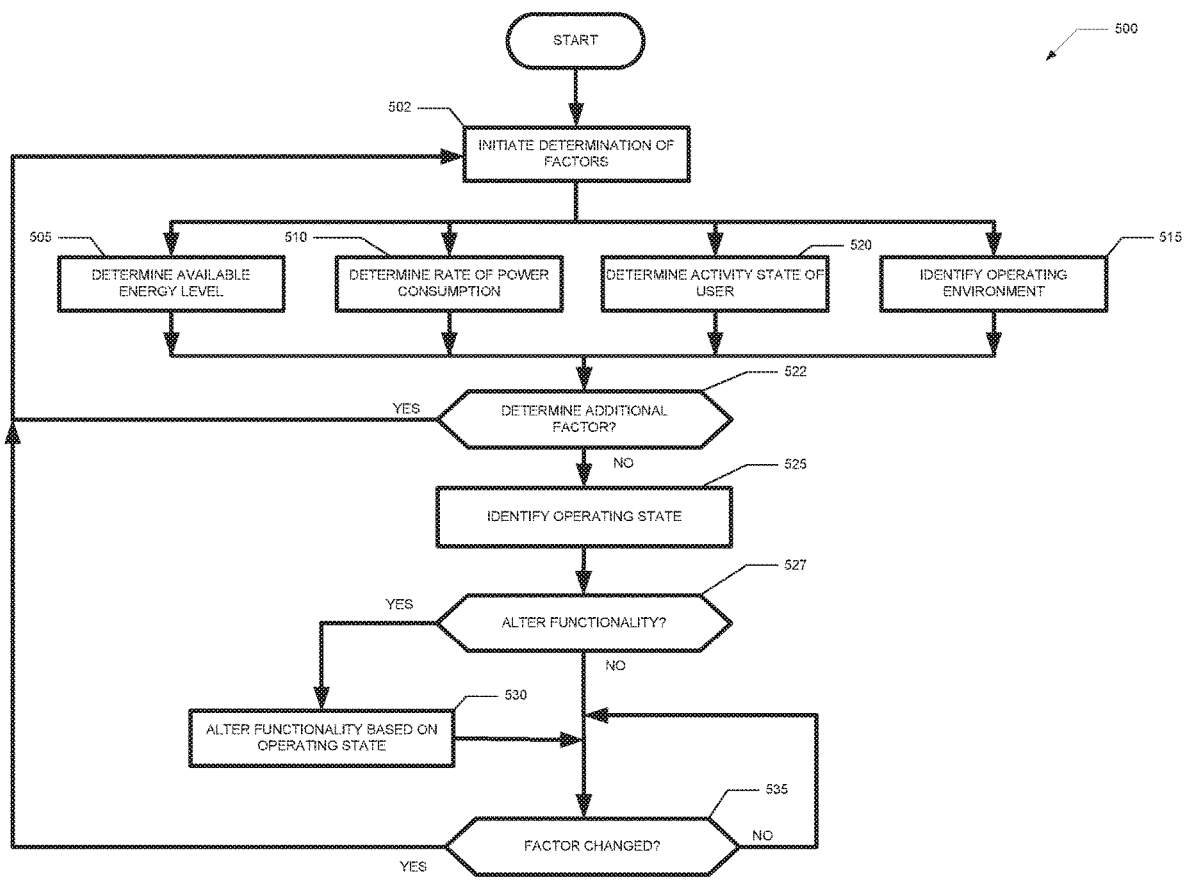
FIG. 5 illustrates a flow diagram of an example method to monitor and identify an appropriate operating state of a user of the trading device.

FIG. 5 is an example flowchart 500 for instructions to implement the operational control module 400 of FIG. 4. The example flowchart 500 instructions gather the power level, power consumption, activity, and/or environment operating factors to identify the operating state of the computing device 300. FIG. 5 illustrates an evaluation of a plurality of operating factors. Certain examples determine an operating state and/or otherwise control operation of the computing device 300 based on one or more determined operating factors. The components of the operational control module 400 (e.g., the energy monitor 402, the activity monitor 404, and/or the environmental monitor 406) may be controlled by this instruction set.

Upon activation of the operational control module 400, control begins at block 502. At block 502, the operating state identifier 408 begins a determination of operating factors using at least one of the example energy monitor 402, the activity monitor 404, and/or the environmental monitor 406. In some examples, the operational control module 400 may be provided with an indication of which operating factor to determine (e.g., measure). For example, the operating state identifier 408 may be provided instructions from a user of a computing device 300, the instructions indicating a first operating factor to determine. In other examples, the operating state identifier 408 may proceed to determine a default first operating factor using at least one of the example components (e.g., the example energy monitor 402, the activity monitor 404, and/or the environmental monitor 406). The operational control module 400 may proceed to determine operating factors associated with any of blocks 505 (e.g., power level), 510 (e.g., power consumption), 515 (e.g., operating environment), or 520 (e.g., activity), for example.

At block 505, the energy monitor 402 of the example operational control module may first determines if power is supplied from a battery of the computing device 300 or if power is supplied externally (e.g., wall power). If power is determined to be supplied via battery, the example energy monitor 402 then determines the capacity of the battery and the remaining power reserved in the battery (e.g., in units such as milliamp hours, as a percentage of capacity, etc.). In some examples, the energy monitor 402 measures reference voltages and observed currents or, in other examples, obtains the value from a smart module contained within the battery itself. In some examples, before control leaves block 505, measurements obtained in scientific units may be converted to a percentage equivalent with reference to capacity. The measurements made by the energy monitor 402 at block 505 constitute the power level factor.

At block 510, the energy monitor 402 may determine a rate of power consumption of the computing device 300. The energy monitor 402 queries the computing device 300 to obtain a measurement (e.g., in milliamp hours per second) for the current operating state. At block 510, the energy monitor 402 compares the obtained measurement to a power consumption average of the computing device 300. The energy monitor 402 monitors the power consumption average, even when the operational control module 400 is inactive, to provide a more accurate figure. Alternatively, the computing device 300 may maintain the power consumption average. To help ensure that the average power consumption is relevant to the observed power consumption, an active average is kept. The active average is the power consumption average for the duration the computing device is executing the trading application. In some examples, a standard deviation is also maintained for the observed power consumption measurements to allow for dynamic rating of changing power usage situations. The measurements made by the energy monitor 402 at block 510 constitute the power consumption factor.

In some examples, the energy monitor 402 is configured to provide classifications of observed measurements. For example, if the power consumption measurement is greater than one standard deviation above the power consumption average, the energy monitor 402 rates the power consumption as high. If the power consumption measurement is less than one standard deviation below the power consumption average, for example, the energy monitor 402 rates the power consumption as low. If the power consumption measurement is within one standard deviation above or below the power consumption average, for example, then the power consumption is rated as normal by the energy monitor 402. Alternatively, a static percentage range may be set for each of the high, low, and normal power consumption measures. For example, any of the foregoing mentions of standard deviation may be replaced with a static percentage figure such as ±5%.

At block 515, the environmental monitor 406 may determine environmental measurements of the operating environment of the computing device 300. Light and sound are observed and reported as descriptive of the operating environment. The light measurements may be rated in lux at a high, low or normal level, for example. Similarly, sound measurements may be rated in decibels at a high, low, or normal level, for example. User attention of the user of the computing device 300 may also be measured in determining an operating state by the environmental monitor 406 and categorized by true or false values. The measurements made by the environmental monitor 406 at block 515 constitute the environmental factor.

Turning to block 520, the activity monitor 404 may determine an activity measurement of the user. The activity monitor 404 leverages motion sensors to facilitate determination of activity state by identifying, for example, velocity, acceleration, and/or attitude of the computing device 300. Upon determination of the velocity and/or acceleration, the motion of the computing device 300 may be characterized as vehicular motion, human motion, stationary, etc. The measurements made by the activity monitor 404 at block 520 constitute the activity factor.

In some examples, the example activity monitor 404 provides further resolution of vehicular and person motion. Such further resolution may provide a distinction between automobile and airplane motion, or in the case of human motion, a distinction between walking, jogging, or sprinting, for example.

In certain examples, the activity monitor 404 may determine the attitude, or orientation of the device, of the computing device 300 using the motion sensors and/or the gyroscope of the computing device 300. In these certain examples, the activity monitor 404 may report the attitude of the computing device in angular terms (e.g., degrees above or below horizon) and/or in descriptive terms (e.g., face-up, face-down, vertical, horizontal, etc.). In other examples, the descriptive terms of the attitude may be more granular and may be reported as combinations of terms. For example, a descriptive term describing attitude of "horizontal facedown" may indicate the computing device 300 is laying on a flat surface oriented so that the display or "face" of the device is facing downwards.

In some examples, when the computing device 300 does not include an accelerometer or a gyroscope, the example activity monitor 404 may be in communication with a peripheral accelerometer and/or gyroscope connected to the computing device 300, physically and/or wirelessly, as input devices 318.

Control arrives at block 522 from at least one of blocks 505, 510, 515, or 520. At block 522, the operating state identifier 408 determines whether an operating state may be identified using an operating factor from at least one of the components (e.g., the example energy monitor 402, the activity monitor 404, and/or the environmental monitor 406). In some examples, the operating state identifier 408 may use the current operating state to aid in determining whether an additional operating factor must be determined in order to identify a new operating state. If an additional operating factor is necessary, then control returns to block 502. If additional operating factors are not required, control remains at block 522 until such time that a new measurement of an operating factor is observed by one of the components. For example, the operating state identifier 408 may categorize a power level of 85%, obtained from the energy monitor 402, as "normal." Additionally, the current operating state has no power related adjustments implemented to the computing device 300, for example. In this instance, the operating state identifier 408 may need additional information (e.g., a second operating factor) to identify an operating state because power level characterization has not changed from "normal".

At block 525, the operating state identifier 408 identifies an operating state based on the determined operating factors. The operating state can be quantified for use in controlling operation of the computing device 300. In certain examples, the operating state is identified as a demarcated string of the values constituting the operating state. For example, the values returned by the example energy monitor 402, the activity monitor 404, and/or the environmental monitor 406 may be used to identify the operating state. In certain examples, the operating state may be bounded by brackets, "[" or "]", and values created at the blocks are separated by a forward slash, "/". For example, a computing device 300 executing a trading application and having an identified operating state consisting of: normal power level (N), high power consumption (H) operating in a high light (HL) and low noise (LN) environment while a user is mobile (e.g., not stationary) (M) returns a operating state of: [N/H/HL/LN/M]. In some examples, each operating state is represented by a concatenated string of the operating state. In this example, the operating state is represented by "NHHLLNM". The foregoing example operating state is only an example, and many other naming conventions will be apparent to one skilled in the art.

The operating state can be identified in other ways. In an alternate example, operating states are mapped to regions, and the operating state can be considered an $n^{th}$ dimensional vector of the form presented in Equation 1, wherein each X denotes a monitored category measurement that has been prescribed a numerical value:

$$\vec{v} = \langle X_0, X_1, X_2, \ldots, X_{n-1}, X_n \rangle \quad \text{(Equation 1)}$$

The $n^{th}$ dimensional space that the operating state vector occupies contains segments, $n^{th}$ dimensional volumes, and/or planes that denote certain operating states. As such, any of the monitored category measurements, $X_0 \ldots X_n$, may be ranged or regioned independently (for singular dimensional consideration) of the other monitored category measurements allowing flexibility in the identification of an operating state. Additionally or alternatively, the monitored elements (e.g. battery power) that conform to Boolean values may be regioned to denote $(0, \infty)$ for a TRUE value range and $(-\infty, 0)$ for a FALSE value range. In some examples, elements may be normalized to form a vector magnitude and directional angle describing an operating state. In other examples, an operating state may not be created, and instead, each measurement is considered independent of the others in considering functionality adjustments. When the operating state has been identified, the identified operating state is stored for access by the functionality controller 410.

At block 527, the functionality controller 410 obtains the identified operating state from the operating state identifier 408. Based on this identified operating state, the functionality controller 410 determines if functionality of the computing device 300 or the trading application may be altered. For example, the functionality adjustment rules associated with the identified operating state can be compared to the currently implemented functionality adjustment rules. If rules are the same, adjustments may not be made and control proceeds to block 535. However, if the rules are not identical, adjustments may be made and control proceeds to block 530.

At block 530, the functionality controller 410 implements one or more adjustments associated with the identified operating state. For example, an operating state characterized by a low power level may instruct the functionality controller 410 to decrease transmission rates. A decrease in transmission rates conserves power through via reduced utilization of device resources such as the processor 312. In another example, an operating state characterized by a high power level, a face-up attitude, and a walking activity measurement may instruct the functionality controller 410 to adjust transmission rates to be more frequent than current transmission rates because it is inferred that attention is on the mobile computing device and more rapid information procurement may be vital. In another example, an operating state characterized by a high light environment may instruct the functionality controller 410 to adjust the brightness of the screen of the mobile computing device to be more visible. In another example, an operating state characterized by an activity other than stationary may instruct the functionality controller 410 to adjust the information displayed in the trading application to only display frequently accessed, marked, and/or customized information.

At block 535, the operating state identifier 408 identifies if any of the energy monitor 402, activity monitor 404, or the environmental monitor 406 have changed from their respective last determined values. If the operating state identifier 408 is notified that a measurement of an operating factor associated with the components (e.g., the energy monitor 402, activity monitor 404, or the environmental monitor 406) has changed from a previous value, then control returns to block 502. Until the operating state identifier 408 is notified by one of the components that an operating factor value has changed, control remains at block 535 until such time that a new measurement of an operating factor is observed by one of the components.

Figure 6:
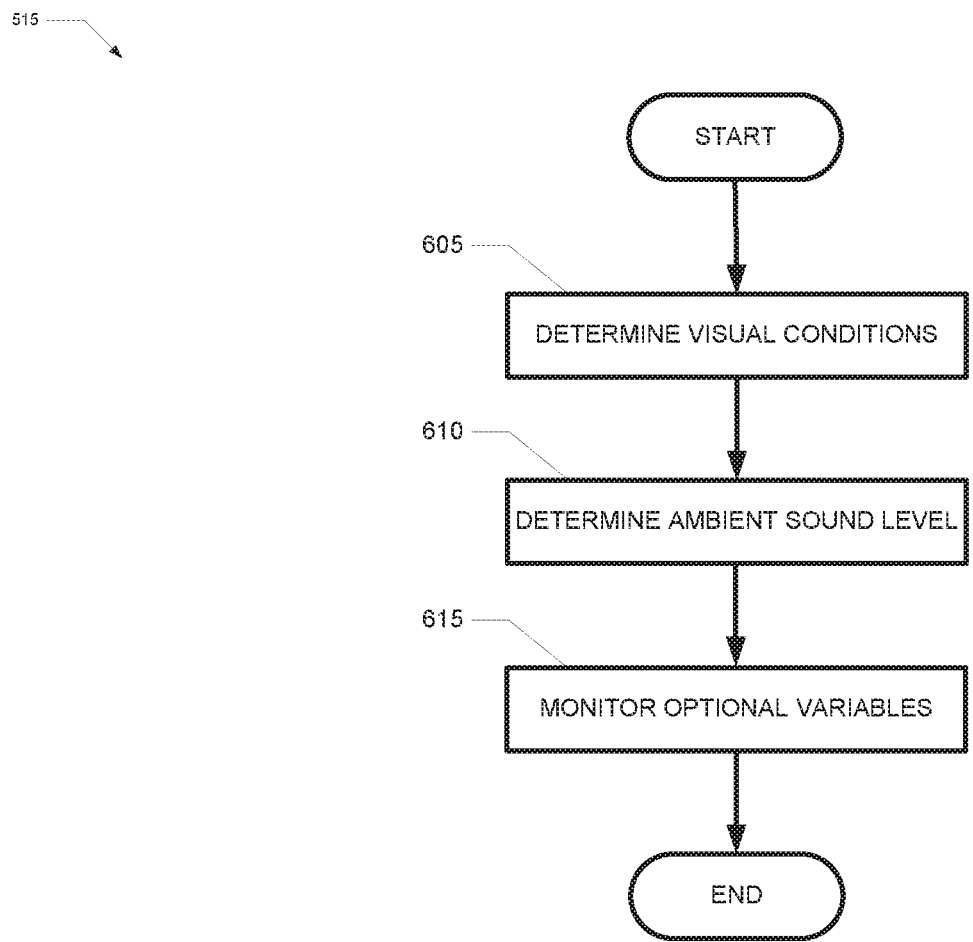
FIG. 6 illustrates a flow diagram of an example method to identify the operating environment of the user of the trading device.

FIG. 6 is an example illustrative flow chart of the instructions governing the operations performed and identified at block 515 of FIG. 5. Beginning at block 605, the environmental monitor 406 begins to monitor, or measure, visual elements such as light and user attention. Light levels are quantified to determine the brightness of an area in which the user is operating the trading application. The light levels may be observed to be high light, low light, or standard, for example. For example, a standard measurement denotes any lighting environment between 100-1,000 lux (lumens per square meter). For example, a standard office setting is generally around 500 lux and a cloudless sunny day is generally 10,000 lux. In response to determination of lighting conditions, the environmental monitor 406 determines if any other visual measurements, such as user attention, should be made. When user attention is incorporated as a measurement of the environmental monitor 406, it is observed through a front facing camera associated with the computing device 300, for example. Using facial detection features present in software of the computing device 300, the environmental monitor 406 can leverage these features to identify when a user is looking at the computing device 300. Facial detection operates by locating image segments that have a high probability of being eyes and mouths, once two eyes and one mouth are located, facial recognition signals that a face has been detected. For example, when the environmental monitor 406 observes two eyes and one mouth through the front facing camera using the facial detection features, it indicates that a face has been detected. If the front facing camera can detect a face, it is inferred that based on detection of two eyes in the field of vision of the front facing camera, the user is engaged with the trading application on the computing device 300. Thus, an indication of user attention is returned as true. When visual measurements are made, control proceeds to block 610.

At block 610, the environmental monitor 406 determines the noise level of the surrounding environment. The environmental monitor uses a microphone to sample ambient audio and analyze the decibel power of the sample. In some examples, a rolling sample average is maintained at block 610 to provide a more stable representation of the audio environment. The decibel level of the audio sample is rated. The sound levels may be rated as high sound, low sound, or standard sound, for example. As an example, a standard measurement denotes any sound environment between 55-75 decibels. To provide some context, a standard office setting generally has background noise of around 65 decibels. Measurement over the example 75 decibels is codified as high noise, and measurement below the example 55 decibels is categorized as low noise, for example. It will be appreciated that these levels are examples and are not written to be limited to these ratings. When the audio level has been identified, control proceeds to block 615.

Turning to block 615, the environmental monitor 406 determines if any other measurements are necessary and/or required. At block 615, customized measurements can be factored in and/or otherwise considered by the environmental monitor 406. Customized or other optional measurements may include facial recognition, temperature, touch, voice recognition, etc. If no additional environmental measurement remains, control may proceed to the corresponding block of FIG. 5 (e.g. block 522).

Figure 7:
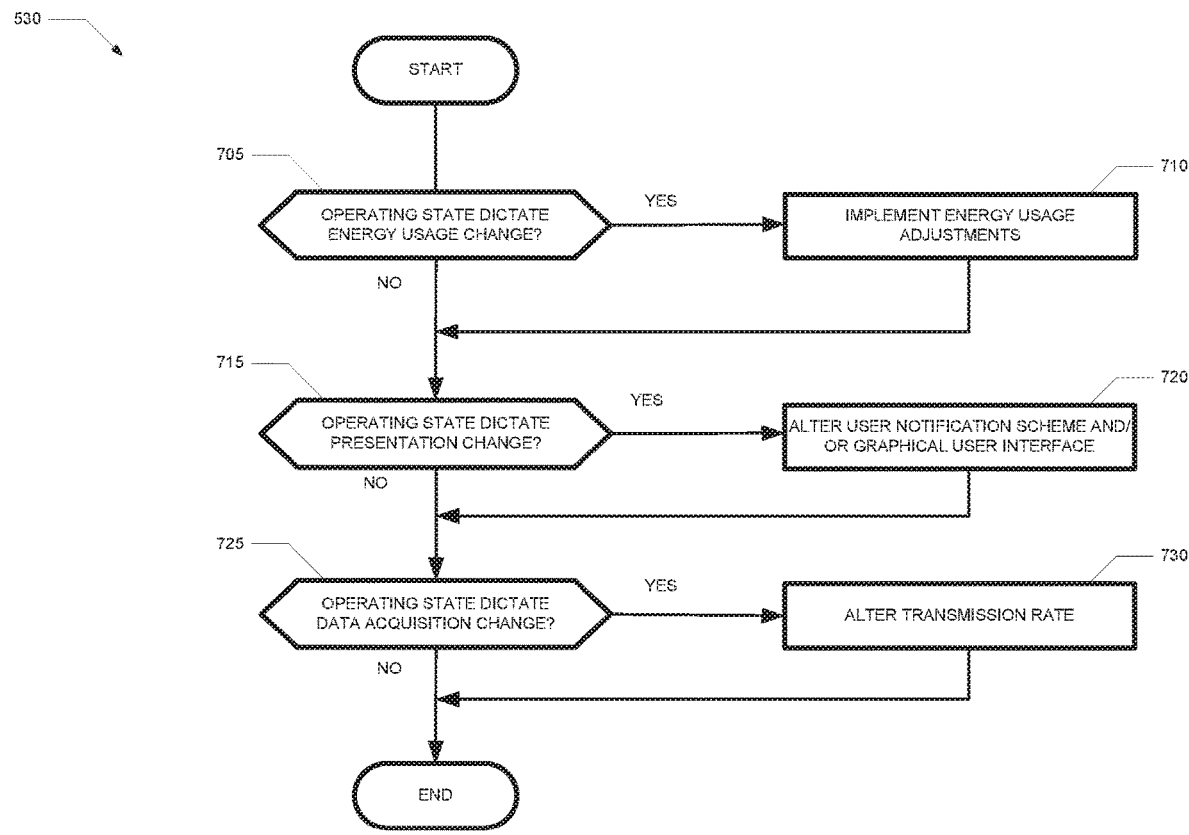
FIG. 7 illustrates a flow diagram of an example method to alter the functionality of the trading device based on the operating state.

FIG. 7 is an illustrative example flowchart of instructions governing the operations performed and identified at blocks 527 and 530 of FIG. 5. The functionality controller 410 of FIG. 4 may be controlled by this instruction set. Additionally, the functionality controller 410 has obtained the operating state created at block 525 of FIG. 5 by the operating state identifier 408. When flowchart 530 of FIG. 7 terminates, the adjustments implemented in blocks 710, 720, and 730 taken together represent the rules enacted according to a new operating state. Control commences at block 705.

At block 705, the functionality controller 410 analyzes power level and power consumption identified in the operating state to determine if actions should be taken to prolong the remaining power of the computing device 300. If the functionality controller 410 determines that there has been a change, control moves to 710. However, if change is not detected, control moves to block 715.

At block 710 the functionality controller 410 implements adjustments to the functionality of the computing device for energy conservation purposes. For example, the functionality controller 410 either removes restrictions on energy usage or takes mitigating actions to prolong the remaining battery power. For example, if at block 715, power consumption is identified as high, the functionality controller 410 determines all processes running on the computing device 300. Then, the functionality controller 410 identifies all processes executing that are non-essential to maintaining the operation of the trading application and/or computing device 300. Once these processes are identified, the functionality controller 410, in cooperation with the processor 312 of the computing device 300, adjusts (e.g., kills, reduces status, idles, suspends, etc.) one or more unessential processes. That is, an unessential process is one which is deemed not useful to continue stable execution of the trading application and the computing device 300. If the power consumption is normal, the functionality controller 410 determines battery level before taking action against running processes. In the event the power consumption is low, no action is taken, and the functionality controller 410 begins a power level check.

At block 715, the power level check is implemented at the functionality controller 410. If the power level is determined to be one of external power or normal, all implemented energy based restrictions are removed from operation of the device and no further energy based adjustments are implemented. If the functionality controller 410 determines that the power level is low or critical, then one or more actions may be taken automatically or presented to the user for approval. For example, the communication radios (e.g., Wi-Fi™, Zigbee™, Bluetooth™ 4G/LTE™) of the computing device 300 can be shut down for periods according the transmission rate of the trading application (e.g., a transmission rate operation mode). That is, if the transmission rate is set to 5 seconds, the communication radios of the computing device 300 can be shut off until the time of transmission has arrived again. When transmission occurs, the communication radios can be turned on just long enough to complete the transmission and then shut off again. In certain examples, the transmission rate may be adjusted in conjunction with block 730 and, any change at block 730 in the transmission rate will be noted and followed here at block 710. In some examples, power management options taken accepted in this block may be learned and stored over time so that distracting options are not provided during low power situations.

For example, if, in the event the power level is at the critical level, the functionality controller 410 removes a user's choice and automatically implements all optioned changes mentioned above. For example, all peripherals may be unpowered and peripheral communication may be halted, all applications and unessential processes are closed, the screen is dimmed, and the communication radios enter a low transmission rate state indicative of an example power save operation mode.

At block 715, the functionality controller 410 determines if a change in presentation is necessary or desirable. For example, the functionality controller 410 identifies changes to the operating factor measurements of the operating state of activity and/or environment by comparing the last operating factor measurements of activity and/or environment. Such changes to the activity or the environment may prevent the computing device 300 from operating as intended. For example, a noisy environment may not be conducive to the use of audio notifications. In other examples, a rapid moving computing device 300 may not need to present a plethora of information if it is incapable of being interacted with. If no change is detected to the operating factor measurements of activity and/or environment, control proceeds to block 725. However, if change is detected to the operating factor measurements of activity and/or environment, control proceeds to block 720.

At block 720, presentation changes are implemented with respect to how information is offered by the trading application through changes to the graphical user interface and/or notification schemes used by the trading application. The changes implemented at the graphical user interface of the trading application may be individually customized by the user of the trading application in response to operating states. For example, if the operating state indicates that a measurement of the activity factor is unstable (e.g., a rapidly changing gyroscope measurement), then only information deemed pertinent by the user will be displayed in a simplified graphical format on the computing device 300. For example, when an operating state denotes a jostling movement (e.g., running), it is unlikely that undivided attention is given to the computing device 300 or trading application and, thus, only select information may be displayed. In some examples, if the operating state identifies that the computing device 300 is in a situation too noisy to utilize audible notifications, the notification scheme may be altered to provide a combination of vibration and visual alerts (e.g., utilizing the LED flash of a camera associated with the computing device 300). From the foregoing, it will be appreciated that adjustments are implemented at block 720 to intuitively react to the operating state to provide a more optimal presentation of information of the computing device 300 and/or trading application. Control then proceeds to block 725.

At block 725, the functionality controller 410 determines if the operating state dictates that a change to transmission rate of the computing device 300 is necessary. The functionality controller 410 identifies any changes to the operating state of power level, power consumption, activity, or environment. If no change is detected, control returns to block 505 of FIG. 5. However, if change is detected, control proceeds to block 730.

At block 730, the functionality controller 410 analyzes the operating state to determine if the transmission rate of the computing device 300 and/or the trading application should be changed by analyzing a power level factor and an activity factor. In some examples, adjustments to the transmission rate may be customized. For example, if the power level factor is deemed normal or externally sourced, restrictions implemented on the transmission rate of the trading application may be removed and the transmission rate may remain at (or return to) a first transmission rate. In some examples, if the power level factor is deemed low, a second transmission rate restriction may be implemented to slow the transmission rate with respect to the first transmission rate. In other examples, if the power level factor is deemed critical, a third transmission rate restriction may be implemented at a third rate that operates slower than both the first and second transmission rates. In some examples, if the functionality controller 410 determines that the activity factor in the operating state is not stationary; the transmission rate may be slowed due to an inferred lack of user attention. For example, if the activity of the computing device 300 is deemed to be non-stationary, the transmission rate may be at a second rate of a longer duration. Control then returns to block 505 of FIG. 5.

In operation, for example, assume a user begins operating a trading application on a computing device 300 including an operational control module 400. In this example, the operational control module 400 monitors a power level factor, a power consumption factor, an activity factor, and an environmental factor. The energy monitor 402 of the operational control module 400 identifies an external power source and informs the operating state identifier 408. The operational control module 400 identifies a first operating state. The functionality controller 410 identifies a first rule set associated with the first operating state. The first rule set identified by the functionality controller 410 indicates no adjustment(s) to be implemented to the operation of the trading application or functionality of the computing device 300. The functionality controller 410 implements no changes, and the computing device 300 and trading application continue to operate. Subsequently, a user removes the computing device 300 from an external power source (e.g., a wall outlet). At some time later, the operational control module 400 identifies a second operating state denoting an activity factor indicative of jogging associated with the user of the computing device 330. The second operating state has a power level factor of normal, a power consumption factor of normal, and an environmental factor of low light, and normal sound. In response to the activity factor and environmental factor of the second operating state, the functionality controller 410 identifies a second rule set. The second rule set indicates changes to be implemented in a jogging and low light indication. Rules regarding the environmental factor indicate that the screen of the computing device 300 is to be dimmed. Rules regarding the activity factor (e.g., jogging), indicate that the transmission rate of the trading application of the computing device 300 is to be extended to a second rate longer than the previous rate. The functionality controller 410 then dims the screen of the computing device 300 while concurrently delaying the transmission rate of the computing device 300 to a second rate, longer than the first rate.

As another example, if the computing device 300 is identified by the activity monitor 404 of the operational control module 400 as face-down and stationary, the transmission rate would be lengthened. If the computing device 300 is identified in the activity factor as face-down and not moving, it may be inferred that a user of the computing device 300 is not actively participating with the computing device 300. In some examples, an orientation (e.g., portrait or landscape) may be identified as a common orientation by the operating state identifier 408. Upon detection of a transition to the un-common orientation by the activity monitor 404 of the operational control module 400, the transmission rate may be suspended in order to view the current information on the computing device.

As another operational example, if the activity monitor 404 of the operational control module 400 determines that the computing device 300 is moving (e.g., accelerating at a rate greater than +/−3 meters per second squared $(m/s^2)$ in any axis) and the attitude of the computing device 300 is unable to be determined, it may be inferred from the activity factor that the device is moving rapidly and may not be effectively viewed. In such an operating state the operational control module 400 may lengthen the transmission rate to a longer period and take power conservation actions due to an inferred lack of interaction.

It will be appreciated from the foregoing that the examples provided herein present example adjustment options available to the operational control module 400. The ranges and ratings provided herein for the measurements associated with the modules of the operational control module are adjustable and not to be read as limiting, inflexible, or unadjustable. Additionally or alternatively, the adjustments described herein are likewise customizable and/or adjustable.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A system comprising:
a mobile computing device including a processor and a sensor,
wherein the processor of the mobile computing device is configured to monitor data provided by the sensor of the mobile computing device regarding an operating factor of the mobile computing device;
wherein the processor of the mobile computing device is configured to determine a first operating state of the mobile computing device based on the operating factor; and
wherein the processor of the mobile computing device is configured to alter a transmission rate of the mobile computing device with respect to a trading application executed by the mobile computing device based on the first operating state, the transmission rate having a specified interval in which the mobile computing device requests and receives market data.

2. The system of claim 1, wherein the operating factor is at least one of a power level factor, a power consumption factor, an environmental factor, and an activity factor.

3. The system of claim 1, wherein the data provided by the sensor comprises at least any one of light data and audio data.

4. The system of claim 1, wherein the data provided by the sensor comprises at least any one of motion data and orientation data.

5. The system of claim 1, wherein the operating factor comprises an activity factor determined according to at least any one of the motion data and orientation data.

6. The system of claim 1, wherein the processor of the mobile computing device is further configured to alter the transmission rate by at least any one of process execution, power distribution, notification scheme, graphical user interface display, peripheral control, and application execution with respect to the trading application based on the first operating state.

7. The system of claim 1, wherein the first operating state is indicative of a level of user attention with respect to the trading application of the mobile computing device.

8. The system of claim 1,
wherein the processor of the mobile computing device is configured to determine a second operating state of the mobile computing device based on the at least one operating factor; and
wherein the processor of the mobile computing device is configured to alter the transmission rate of the mobile computing device with respect to the trading application based on the second operating state.

* * * * *